United States Patent [19]

Frye

[11] Patent Number: 5,066,411

[45] Date of Patent: Nov. 19, 1991

[54] SOLID, PLIABLE ORGANIC COMPOUND FOR HOT/COLD THERMAL RESERVOIR

[76] Inventor: Ruth E. Frye, 505 S. Main St., Lindsay, Okla. 73052

[21] Appl. No.: 499,624

[22] Filed: Mar. 26, 1990

[51] Int. Cl.$^5$ ................................................ C09K 5/00
[52] U.S. Cl. ........................................ 252/70; 165/10
[58] Field of Search ............... 252/70; 128/399, 402, 128/403; 165/10

[56] References Cited

U.S. PATENT DOCUMENTS

| | | | |
|---|---|---|---|
| 3,871,376 | 3/1975 | Kozak | 128/403 |
| 4,462,224 | 7/1984 | Dunshee et al. | 128/403 |
| 4,596,250 | 6/1986 | Beisang, III et al. | 128/403 |
| 4,756,311 | 7/1988 | Francis, Jr. | 128/403 |

FOREIGN PATENT DOCUMENTS

| | | | |
|---|---|---|---|
| 0257720 | 3/1988 | European Pat. Off. | 252/70 |
| 61-79991 | 4/1986 | Japan | 252/70 |

Primary Examiner—Paul Lieberman
Assistant Examiner—Christine A. Skane
Attorney, Agent, or Firm—Dennis T. Griggs

[57] ABSTRACT

An organic thermal reservoir material containing hydroxyethylcellulose compounded with propylene glycol yields a dry, solid core material. Best results are obtained in a formulation comprising about 4 parts by volume of hydroxyethylcellulose and about 3 parts by volume of propylene glycol. The resultant organic compound is non-toxic, solid, non-tacky, dry and moldable into a solid structural form.

2 Claims, 2 Drawing Sheets

SOLID, PLIABLE ORGANIC COMPOUND FOR HOT/COLD THERMAL RESERVOIR

FIELD OF THE INVENTION

The present invention relates generally to body-warming and body-cooling devices and in particular to passive thermal energy storage materials for use in such devices.

BACKGROUND OF THE INVENTION

Body-warming and body-cooling devices are known for application to a portion of a body, such as hands, head, ears and back to provide warmth or cooling for comfort and for therapeutic purposes. For example, heating pads, ice packs and cold compresses are used for such purposes. Some hot and cold packs include a liquid solution or gel material sealed within a flexible container for storing thermal energy. Such containers may burst in response to overheating. In the event the container should rupture, the hot liquid or gel material will leak and may cause burn injury to the user. Moreover, in the event such a liquid or gel material should be used in a cold pack, there is a risk that the container may rupture upon being frozen, thereby permitting the liquid or gel material to leak upon thawing.

DESCRIPTION OF THE PRIOR ART

Examples of hot and cold pack devices which disclose a liquid or gel material sealed within a container are disclosed in the following U.S. Pat. Nos.:

| | | |
|---|---|---|
| 1,964,655 | 2,203,591 | 2,375,087 |
| 2,547,886 | 2,697,424 | 2,715,315 |
| 2,749,914 | 2,783,806 | 3,092,112 |
| 3,349,825 | 3,885,403 | 4,694,829 |

The prior art also discloses various structures in which the thermal reservoir material may be packaged, such as a jacket (U.S. Pat. No. 2,403,676), and various shapes that the envelope container may take, such as a compress shaped to conform to the forehead of a person (U.S. Pat. No. 1,964,655), and a glove (U.S. Pat. No. 2,515,298).

A limitation on each of the foregoing conventional body-warming and body-cooling devices is that a sealed container must be provided, and the liquid or gel material is subject to leakage should the container rupture or be punctured. Some thermal storage materials are toxic or corrosive. Moreover, the liquid or gel thermal material is not capable of maintaining a desired form or structure, and must be encapsulated or otherwise supported by a rigid container to maintain a desired shape.

OBJECTS OF THE INVENTION

It is, therefore, the principal object of the present invention to provide a thermal reservoir material which may be frozen or heated and which will not burst, explode, burn, melt or drip when heated to above the boiling point of water, or cooled below the freezing point of water.

Another object of the invention is to provide a thermal reservoir material which can be molded into various structural forms, and which will maintain its molded form after curing.

Yet another object of the present invention is to provide a thermal reservoir material which can be used for body-cooling as well as body-warming applications.

Another object of the invention is to provide a dry thermal reservoir material suitable for both hot and cold service which is soft and pliable.

Still another object of the invention is to provide a dry thermal reservoir material of the character described, which can be used as a particulated stuffing material.

Another object of the invention is to provide a dry thermal reservoir material which is non-toxic.

A related object of the invention is to provide a dry thermal reservoir material of the character described, which is suitable for use in combination with earmuffs, hats, gloves, socks, shoes, boots, coats, stuffed toys, pillows, beverage coolers, food warmers, refrigerated chests, heating pads, cooling pads, blankets, quilts and the like.

SUMMARY OF THE INVENTION

The foregoing objects are achieved according to the present invention by an organic thermal reservoir material containing hydroxyethylcellulose compounded with propylene glycol which, upon curing, yields a dry, solid core material. The composition may be molded into any desired shape and is non-toxic. More specifically, the organic thermal reservoir composition of the subject invention is produced by mixing about three parts by volume of propylene glycol with about four parts by volume of hydroxyethylcellulose. During the reaction, an OH group on a carbon atom of the hydroxyethylcellulose molecule is released and the propylene glycol combines with an oxygen atom of the cellulose molecule. Water ($H_2O$) is a reaction by-product which is removed during curing. The resultant organic compound is non-toxic, solid, non-tacky, dry and moldable into a solid, pliable structural form.

Other features and advantages of the present invention will be appreciated by those skilled in the art upon reading the detailed description which follows in connection with the attached drawings, wherein:

DETAILED DESCRIPTION OF THE PREFERRED FORMULATION

Figure 1:
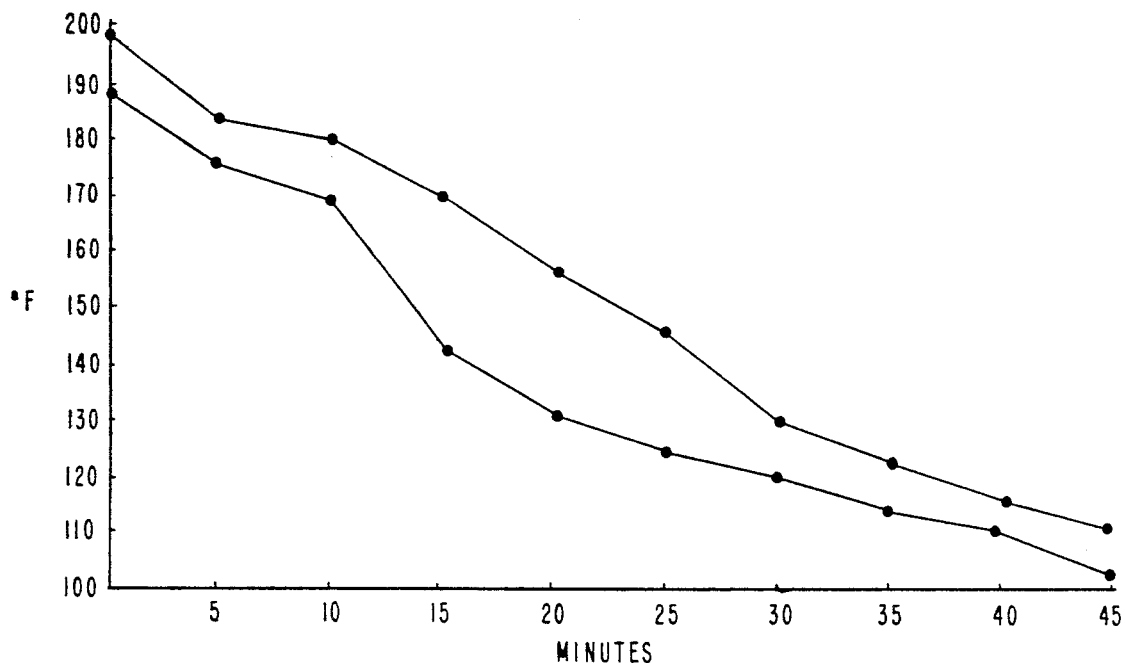
FIG. 1 is a graph of sample temperature (° F.) as a function of time which represents the heat retention capabilities of first and second sample compositions of the preferred formulation

The present invention provides an organic thermal reservoir composition which includes, as its active ingredients, hydroxyethylcellulose and propylene glycol Satisfactory results for molded applications have been obtained by compounding from about 20% to about 40% part by volume of propylene glycol with about 60% to about 80% part by volume of hydroxyethylcellulose. The best results for molded applications have been obtained by compounding three parts by volume of propylene glycol with four parts by volume of hydroxyethylcellulose.

The preferred formulations for molded (consolidated) embodiments of the present invention are combined in the following proportions:

| VOLUME PERCENT - CONSOLIDATED | | | |
|---|---|---|---|
| COMPONENT | SUITABLE | PREFERRED | MOST PREFERRED |
| propylene glycol | 20–40 | 25–35 | 25 |
| hydroxyethylcellulose | 60–80 | 65–75 | 75 |

The preferred formulation yielded by the reaction of the foregoing components is shown in Table I.

The composition of the consolidated embodiment is preferably made in a batch process as follows The ingredients are placed in a vessel such as a stainless steel mixing tank. Hydroxyethylcellulose powder is placed in the tank and then liquid propylene glycol is poured into the tank in the preferred proportions as set forth above. The mixture is then agitated by suitable means such as a stirrer Stirring is continued until a smooth, homogenous mixture is obtained Thereafter, the mixture is placed in a suitable container having a desired form, or in the cavity of a mold. The mixture is then cured by baking in an oven at 110°–170° F. until the water by-product has been substantially removed. Alternatively, the mixture is cured by irradiating it in a microwave oven.

According to an unconsolidated embodiment, the reaction mixture of propylene glycol with hydroxyethylcellulose does not require the application of heat or curing. The resulting mixture has a dry, crumbly consistency and has an average size comparable to the size of bread crumbs. This dry, unconsolidated mixture is well suited for use as a stuffing material. Best results for producing an unconsolidated crumbly mixture for stuffing applications has been obtained by compounding one part by volume of propylene glycol with two parts by volume of hydroxyethylcellulose.

The preferred formulations for the dry, unconsolidated stuffing material embodiment of the present invention are combined in the following proportions:

| VOLUME PERCENT - UNCONSOLIDATED | | | |
|---|---|---|---|
| COMPONENT | SUITABLE | PREFERRED | MOST PREFERRED |
| propylene glycol | 25–40 | 25–35 | 33 |
| hydroxyethylcellulose | 60–75 | 65–75 | 67 |

REFERENTIAL EXAMPLES

In order to provide a better understanding of the present invention including representative advantages and limitations thereof, the following referential examples are offered as related to certain tests performed in the practice of this invention, and illustrate the excellent heat retention and cold retention properties of the preferred formulations, as follows:

EXAMPLE 1

A 42 gram sample 10 of the preferred formulation was prepared by reacting three parts by volume of propylene glycol with four parts by volume of hydroxyethylcellulose. The sample was cured and thereafter shrink wrapped in one thickness of 52 mil plastic film. The bulb of a mercury thermometer was embedded within the sample. The temperature within the test facility was maintained constant at 74° F throughout the test, and was free from draft.

The sample 10 was heated in an oven until an initial temperature of 188° F. was produced as illustrated by the curv 10 in FIG. 1. It was then allowed to cool at room temperature (74° F.) and the rate of cooling was determined by recording the indicated temperature of the sample at 5 minute intervals during a 45 minute period.

After 5 minutes, the sample 10 had cooled to 176° F. After 10 minutes, the indicated temperature of sample 10 was 170° F. The most substantial decline occurred during the interval 10 minutes to 15 minutes, in which the temperature dropped by 28° F. to 142° F. The decline remained consistent with no more than a 4° F. decline per 5 minute interval during the remainder of the test. After 45 minutes had elapsed, the temperature of sample 10 had dropped to 102° F.

The sample 10 was tested a total of 6 times, with the temperature measurements being recorded at 5 minute intervals during each test. Each time, the sample 10 was heated to an initial temperature of about 187° F, with the indicated temperatures of the respective readings varying by no more than about 3° F., and having an average variation of about 1° F. per reading.

In summary, sample 10 decreased in temperature by a total of 86° F. in 45 minutes or at an average rate of 1.9° F. per minute. The average rate of heat loss was at a rate of 1.1° F. per minute during the last 25 minutes of the test.

EXAMPLE 2

The curve designated 20 in FIG. 1 represents the rate of heat loss for a 42 gram sample 20 of the preferred mixture of propylene glycol and hydroxyethylcellulose in the proportions as set forth in Example 1. The sample 20 was blended and cured following the same procedure of Example 1. The sample 20 was first wrapped in a single thickness of 0.125 inch poly fill plastic film, and was then wrapped with two thicknesses of 0.52 mil plastic film. The sample 20 was heated for 40 seconds in a microwave oven to a temperature of 198° F.

The sample 20 was tested a total of 6 times, with the temperature measurements being recorded at 5 minute intervals. Each time, the sample 20 was heated to an initial temperature of about 198° F., with the indicated temperatures of the respective readings varying by no more than about 3° F. per reading, and having an average variation of about 1° F. per reading.

It will be noted that the average rate of heat loss of sample 20 was substantially lower during the interval of 10 minutes to 30 minutes as compared with the sample 10 which had only a single wrapping of plastic film.

EXAMPLE 3

Figure 2:
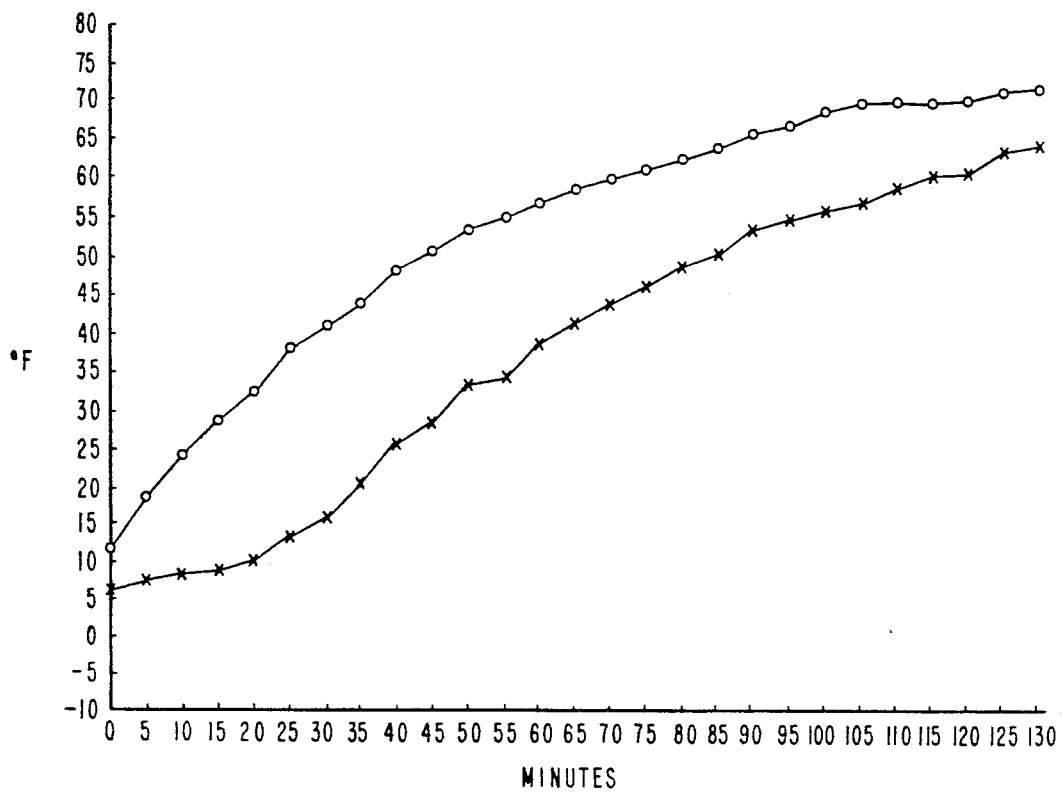
FIG. 2 is a graph of sample temperature (° F.) as a function of time which illustrates the cold retention properties of said first and second sample compositions.

Referring to FIG. 2, a 5 ounce sample 30 of the preferred formulation was prepared by reacting three parts by volume of propylene glycol with four parts by volume of hydroxethylculose as set forth above in Example 1. Ambient temperature was maintained constant at 85° F. The temperature reading was taken at 5 minute intervals with a thermometer embedded within the sample 30. The performance of the cured formulation given above is indicated by the curve 30. The sample was initially cooled to a temperature of 12° F., and was then placed in a room at 85° F. which was free from draft.

The curve 30 shows that the average rate of heat gain was 0.7° F. per minute during the first 60 minutes of the test, and was only 0.25° F. per minute during the next 60 minutes of the test.

The sample 30 was tested a total of 6 times, with the temperature measurements being recorded at 5 minute intervals Each time, the sample 30 was cooled to an initial temperature of about 12° F., with the indicated temperatures of the respective readings varying by no more than about 3° F. per reading, and having an average variation of about 1° F per reading.

EXAMPLE 4

Referring again to FIG. 2, a 5 ounce sample 40 was prepared by adding one part by volume purified water to two parts by volume propylene glycol and four parts by volume of hydroxyethylcellulose. The sample was not cured, but was instead immediately chilled to a temperature of 6° F.

The average rate of heat gain during the first 60 minutes of the test for sample 40 was 0.55° F per minute, and the average rate of heat gain during the second 60 minutes was 0.35° F. per minute.

The sample 40 was tested a total of 6 times, with the temperature measurements being recorded at 5 minute intervals. Each time, the sample 40 was cooled to an initial temperature of about 5° F., with the indicated temperatures of the respective readings varying by no more than about 3° F. per reading, and having an average variation of about 1° F per reading.

The room temperature in which the sample 40 tests were conducted was maintained constant at 85° F.

EXAMPLE 5

Figure 3:
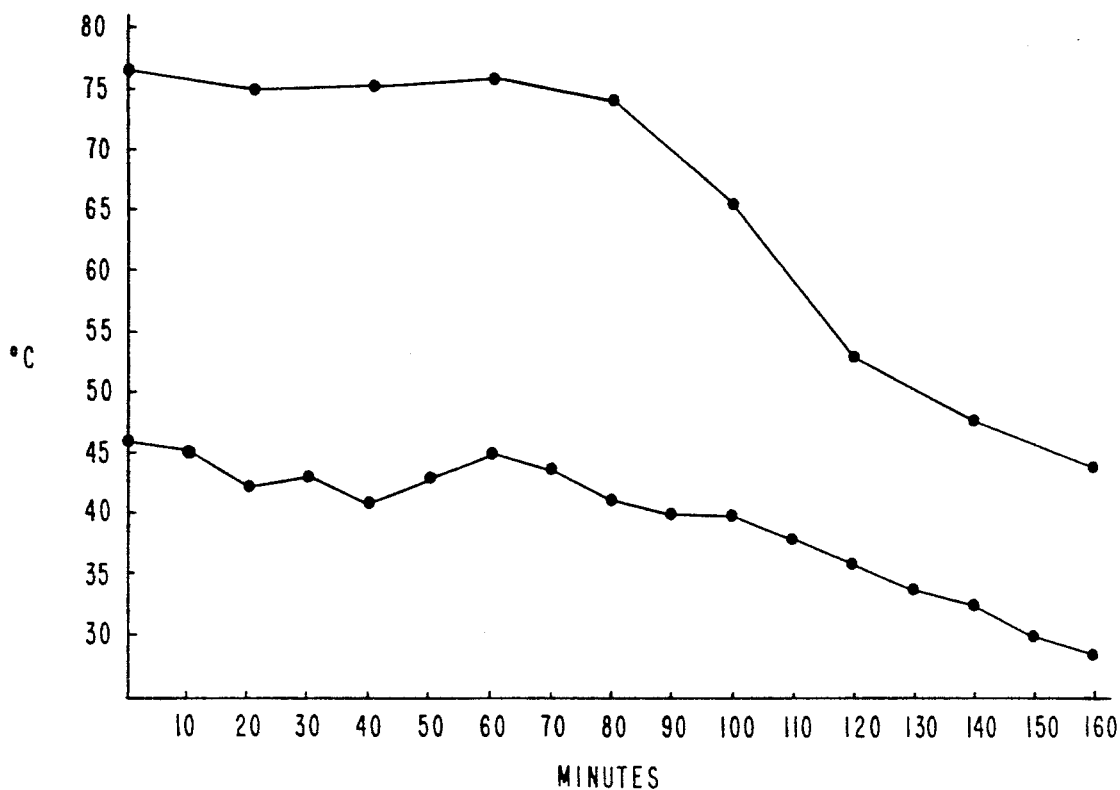
FIG. 3 is a graph of sample temperature (° C.) as a function of time showing the heat retention characteristics of the first and second sample compositions including internal and external insulation means; and, FIG. 4 is a graph of sample temperature (° C.) as a function of time within a water calorimeter during a determination of the specific heat of the organic thermal reservoir material of the preferred formulation.
Figure 4:
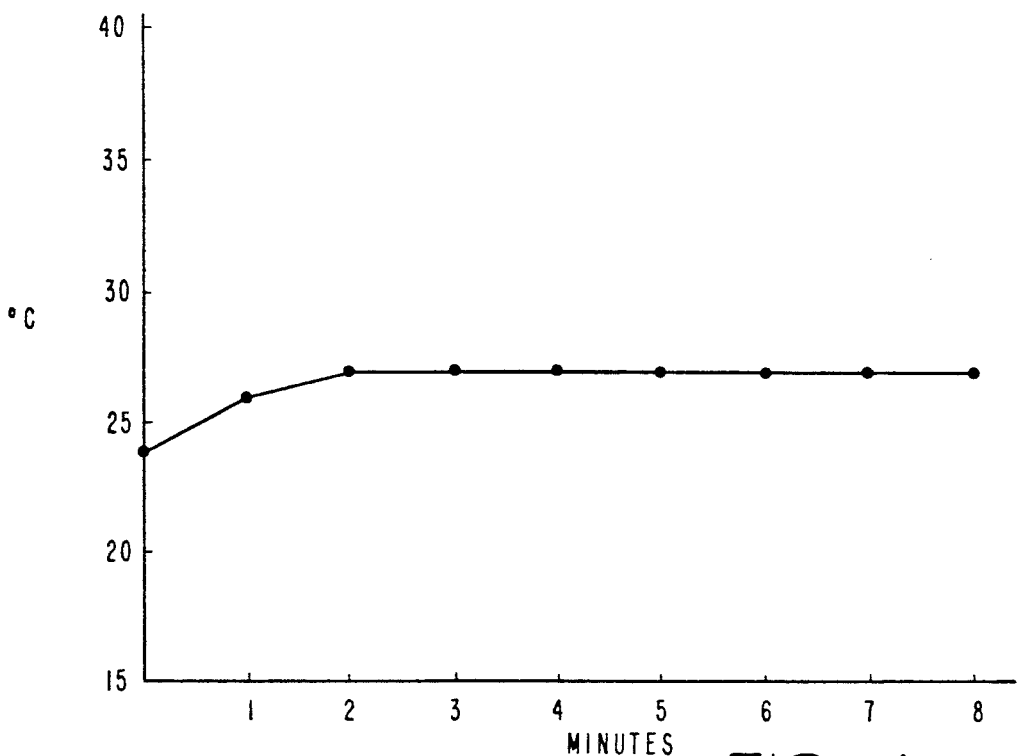

Referring now to FIG. 3, a 4 ounce sample 50 of the preferred formulation was prepared according to the method and proportions given in Example 1. The sample 50 was insulated on one side by a fabric jacket having a thickness of approximately 5 mils to simulate a heat pad. The curve designated 50 in FIG. 3 illustrates the heat loss performance of sample 50 when used as a heat pad. The exposed side of the heat pad was placed onto the body of a subject having a body weight of 185 pounds and a body temperature of 98.6° F. The heat pad sample 50 was applied immediately after removal from the oven. The temperature reading was taken every 5 minutes The room temperature was maintained constant at 25° C.

The sample 50 was tested a total of 6 times, with the temperature measurements being recorded at 10 minute intervals. Each time, the sample 50 was heated to an initial temperature of about 46° C, with the indicated temperatures of the respective readings varying by no more than about 2° C per reading, and having an average variation of less than 1° C per reading.

The average rate of heat loss for the heat pad sample 50, while placed in contact with a subject having a body temperature of 98.6° F, was 0.1° C per minute.

EXAMPLE 6

Referring again to FIG. 3, a sample 60 was prepared using the preferred proportions set forth above, and was molded in the shape of a rectangular pad. The pad sample 60 was sandwiched between two sheets of styrofoam having a thickness of ⅜ inch. A thermometer was embedded within the sample.

The heat loss was negligible during the first 80 minutes of the test. The sample 60 temperature dropped substantially at an average rate of 0.38° C per minute during the last 80 minutes of the test.

The sample 60 was tested a total of 6 times, with the temperature measurements being recorded at 20 minute intervals. Each time, the sample 60 was heated to an initial temperature of about 77° C., with the indicated temperatures of the respective readings varying by no more than about 2° C. per reading, and having an average variation of less than about 1° C. per reading.

EXAMPLE 7

In this example, a 5 gram sample 70 of the preferred formulation was prepared according to the procedure and proportions of Example 1. The sample 70 was placed within a sealed metal container within 100 grams of water in a water calorimeter. The water in the calorimeter and the sample 70 was preheated to an initial temperature of 25° C. The temperature rise from about 25° C. to about 27° C. occurred over a 2 minute interval as indicated by the curve 70. Two hundred calories of thermal energy were input to the calorimeter to raise the temperature of the sample 70 from 25° C. to 27° C., thereby indicating a specific heat value of 20 for the preferred formulation.

EXAMPLE 8

In this example, a 5 ounce sample 80 of the preferred formulation was prepared according to the procedure and proportions of Example 1. Prior to curing, 1 ounce of particulated styrofoam was mixed with the 5 ounces of formulation. The six ounce sample 80 containing the particulated styrofoam was then cured in an oven as set forth in Example 1. The sample 80 was shrink wrapped in one thickness of 0.52 mil plastic film. The bulb of a mercury thermometer was embedded within the sample. The temperature within the test facility was maintained constant at 74° F. throughout the test, and was free from draft. The sample was heated in an oven to an initial temperature of 200° F. It was then allowed to cool at room temperature (74° F.). The sample 80 decreased in temperature at an average rate of 1.2° F. per minute, and was relatively linear as compared with the performance of samples 10 and 20.

EXAMPLE 9

A 5 ounce ounce sample 90 of the preferred formulation was prepared according to the procedure and proportions set forth in Example 1. After curing, the 5 ounce sample was particulated into irregular granules having an average length of 0.3 cm -0.5 cm. Five ounces of expanded, cellular polystyrene (Styrofoam) granules having substantially the same size 0.3 cm -0.5 cm) was then thoroughly mixed with the formulation granules The 10 ounce mixture of formulation and Styrofoam granules was then shrink wrapped in one thickness of 0.52 mil plastic film. The bulb of a mercury thermometer was embedded within the sample 90. The ambient temperature within the test facility was maintained constant at 74° F throughout the test, and was free from draft.

The sample 90 was heated in an oven until an initial temperature of 180° F was produced. The sample 90 was then allowed to cool at room temperature (74° F.) and the rate of cooling was determined by reading the indicated temperature of the sample 90 at 5 minute intervals over a 45 minute period. The sample 90 decreased in temperature at an average rate of 0.9° F. per minute. The average rate of loss was at a rate of 0.6° F. per minute during the last 25 minutes of the test.

Other consolidated formulations were prepared and tested, with the volume ratio of propylene glycol to hydroxyethylcellulose being varied through the range 20-40% for propylene glycol and 60-80% for hydroxyethylcellulose. Marginal heat gain/heat loss performance was noted for the proportion 40% - propylene glycol, 60% hydroxyethylcellulose. The volume ratio of 25-35% propylene glycol and 65-75% hydroxyethylcellulose provided acceptable to good heat loss/heat gain performance. The best results for molded (unconsolidated) product applications, however, were provided by the volume ratio of 3 parts propylene glycol to 4 parts hydroxyethylcellulose. The resulting product, in all of the formulations, was curable to a dry, solid, pliable composition which was non-toxic and nontacky.

A stuffing (unconsolidated) formulation was prepared and tested, with the ratio of propylene glycol to hydroxyethylcellulose being varied through the range of 25 -40 volume percent for propylene glycol and 60 -75 volume percent for hydroxyethylcellulose Marginal heat gain/heat loss performance wa noted for the proportion 40% by volume propylene glycol, 60% by volume hydroxyethylcellulose. The volume ratio of 25-35% propylene glycol and 65-75% hydroxyethylcellulose provided acceptable to good heat loss/heat gain performance The best results for stuffing material product applications, however, were provided by the volume ratio of about 1 part by volume propylene glycol to about 2 parts by volume hydroxyethylcellulose. The resulting product was dry, solid, unconsolidated, crumbly particles approximately the size of bread crumbs which was self-curing when reacted, and did not require heating.

The hydroxyethylcellulose used in the foregoing consolidated and unconsolidated formulations is preferably of cosmetic grade. Cosmetic grade hydroxyethylcellulose may be obtained from Aqualon Corporation of Wilmington, Delaware under the brand name Natrasol ®. The propylene glycol utilized in the foregoing formulations is preferably purified and non-toxic food grade. It can be obtained from commercial suppliers of chemical formulations, for example, Ashland Chemical Company of Dallas, Texas.

The cold retention properties of the molded product application formulations were improved by adding purified water and then freezing the formulation instead of curing it. The enhanced cold retention formulation which included purified water was subject to leakage upon thawing. The heat retention capability of the formulations was enhanced by blending a thermal insulation material such as styrofoam in the formulation before curing, or within the particulated formulation after curing.

The compositions of the present invention have proven effective as a thermal reservoir material for body-warming and body-cooling devices The compositions can be used with or without any type of outside container or envelope, and can be used in combination with various conventional body-warming and body-cooling products including, but not limited to earmuffs, hats, gloves, socks, shoes, boots, coats, terry cloth clothing, head and neck scarves and also in a wide variety of stuffed products including, but not limited to toys and pillows, as well as therapeutic devices such as back braces, heating pads, hot compresses and cold compresses The consolidated formulation can be poured into a mold, and after being heated and cooled, retains its size and shape during both hot and cold service. Moreover, the consolidated formulation can be formed in sheets or layers and applied as a lamination to fabric material. Additionally, fabric material can be embedded within the consolidated formulation prior to curing, thereby producing a composite material having good heat retention and can be used to good advantage, for example, in the construction of quilts and blankets.

The components of the formulation are non-toxic, are biodegradable, and can be heated to a desired temperature in a microwave oven or frozen to temperatures well below zero without damage or performance degradation. Accordingly, the formulation of the present invention is safe for use in consumer products, and in particular for products intended for use by children. Moreover, the consolidated formulation can be molded into any desired shape, thereby making it well suited for applications such as hot and cold beverage holders.

The above volume ratios and reaction conditions have been provided for illustration purposes only. As those skilled in the art will recognize, it is likely that acceptable thermal reservoir material can be produced using reaction ratios and conditions different from the preferred values given above.

TABLE I

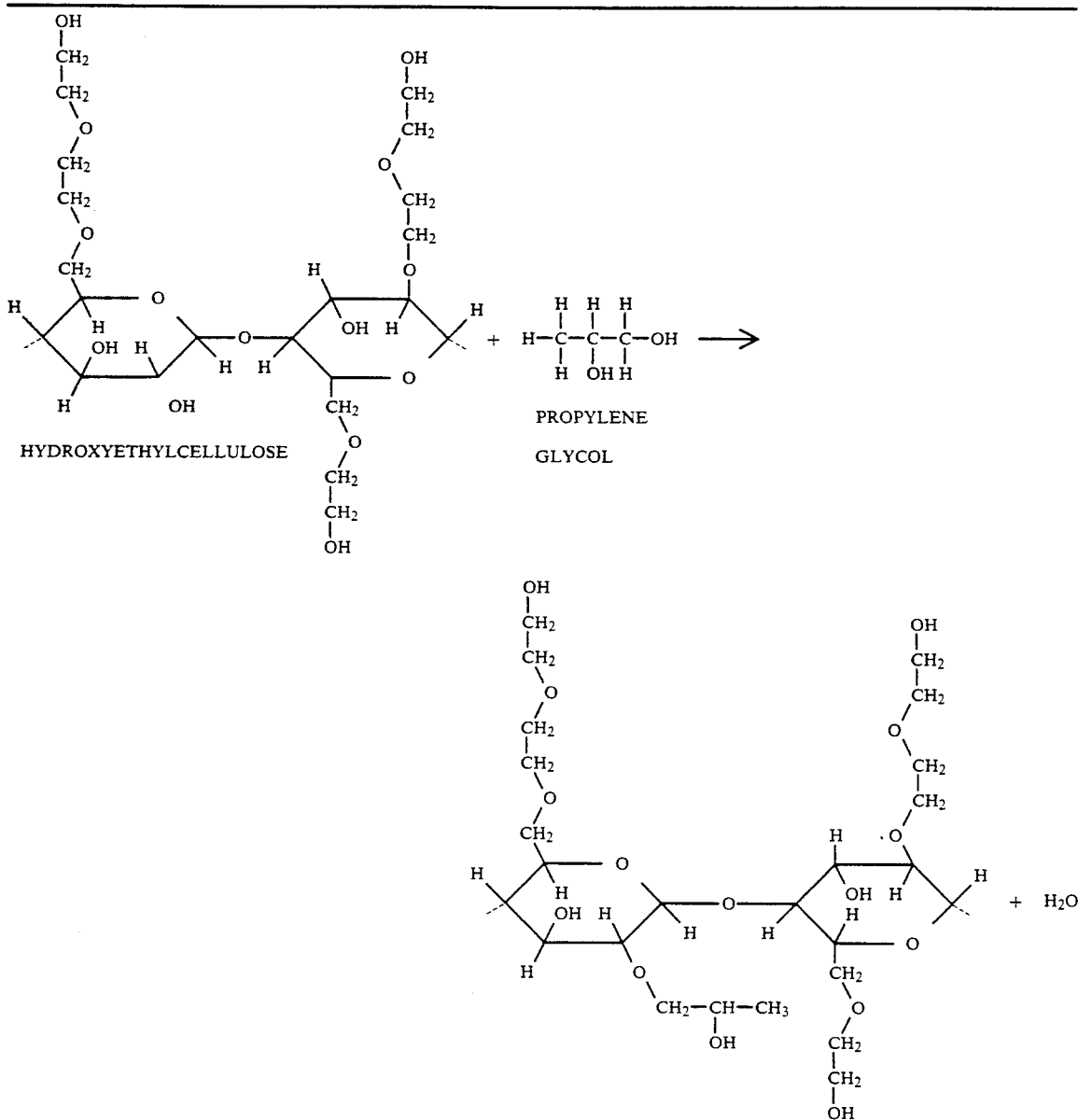

What is claimed is:

1. A thermal reservoir material consisting of propylene glycol compounded with hydroxyethylcellulose in the following proportions:
   propylene glycol, 20-40 volume percent of the total composition; and,
   the balance, hydroxyethylcellulose.

2. A method for making a thermal reservoir material comprising the steps:
   compounding propylene glycol with hydroxyethylcellulose in the following proportions:
   propylene glycol, 20-40 volume percent of the total composition and the balance, hydroxyethylcellulose; and,
   heating the composition to remove water byproduct. to form a product consisting of propylene glycol, 20-40 volume percent of the total composition and the balance, hydroxyethylcellulose.

* * * * *

UNITED STATES PATENT AND TRADEMARK OFFICE
CERTIFICATE OF CORRECTION

PATENT NO. : 5,066,411
DATED : November 19, 1991
INVENTOR(S) : Ruth E. Frye It is certified that error appears in the above-identified patent and that said Letters Patent is hereby corrected as shown below:

Column 2, line 65, "glycol" should be -- glycol. --.

Column 3, line 19, "follows" should be -- follows: --.

Column 3, line 25, "stirrer" should be -- stirrer. --.

Column 3, line 26, "obtained" should be -- obtained. --.

Column 5, line 10, "intervals" should be -- intervals. --.

Column 5, line 51, "minutes" should be -- minutes. --.

Column 6, line 58, "granules" should be -- granules. --.

Column 7, line 36, "wa" should be -- was --.

Column 7, line 44, "performance" should be -- performance. --.

Column 8, line 17, "devices" should be -- devices. --.

Column 8, line 32-33, "compresses" should be -- compresses. --.

Signed and Sealed this

Second Day of March, 1993

*Attest:*

STEPHEN G. KUNIN

*Attesting Officer*  *Acting Commissioner of Patents and Trademarks*